Oct. 19, 1926.
K. E. PEILER
1,603,862
APPARATUS FOR FEEDING MOLTEN GLASS
Filed Dec. 8, 1922 3 Sheets-Sheet 3
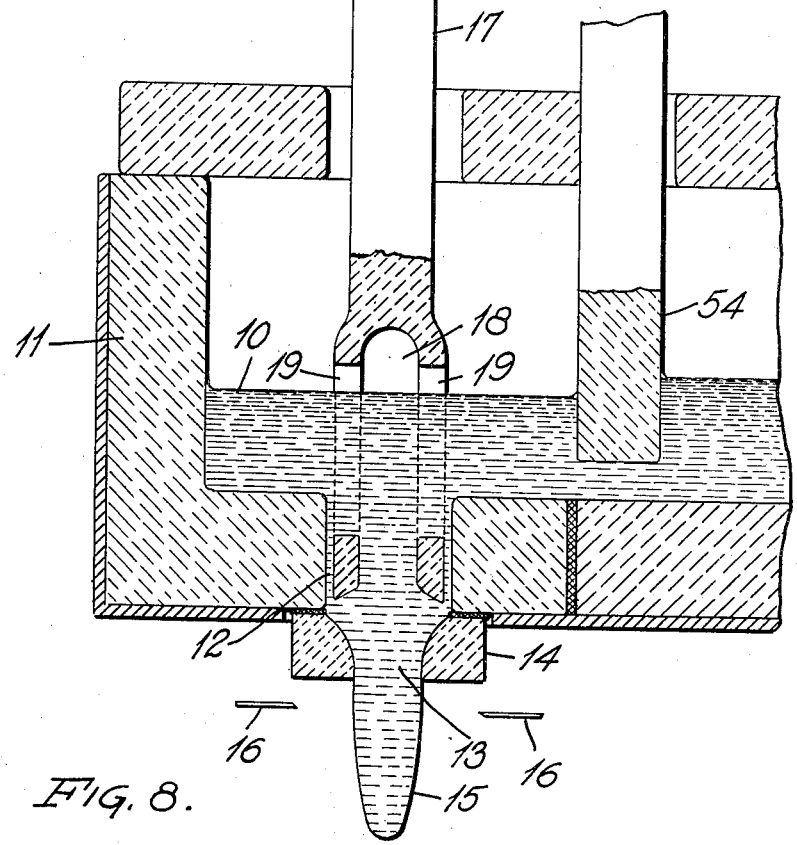
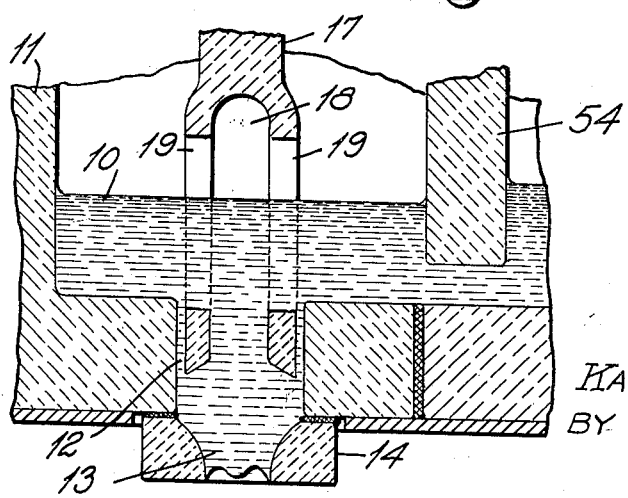
INVENTOR:
KARL E. PEILER
BY
ATT'Y.

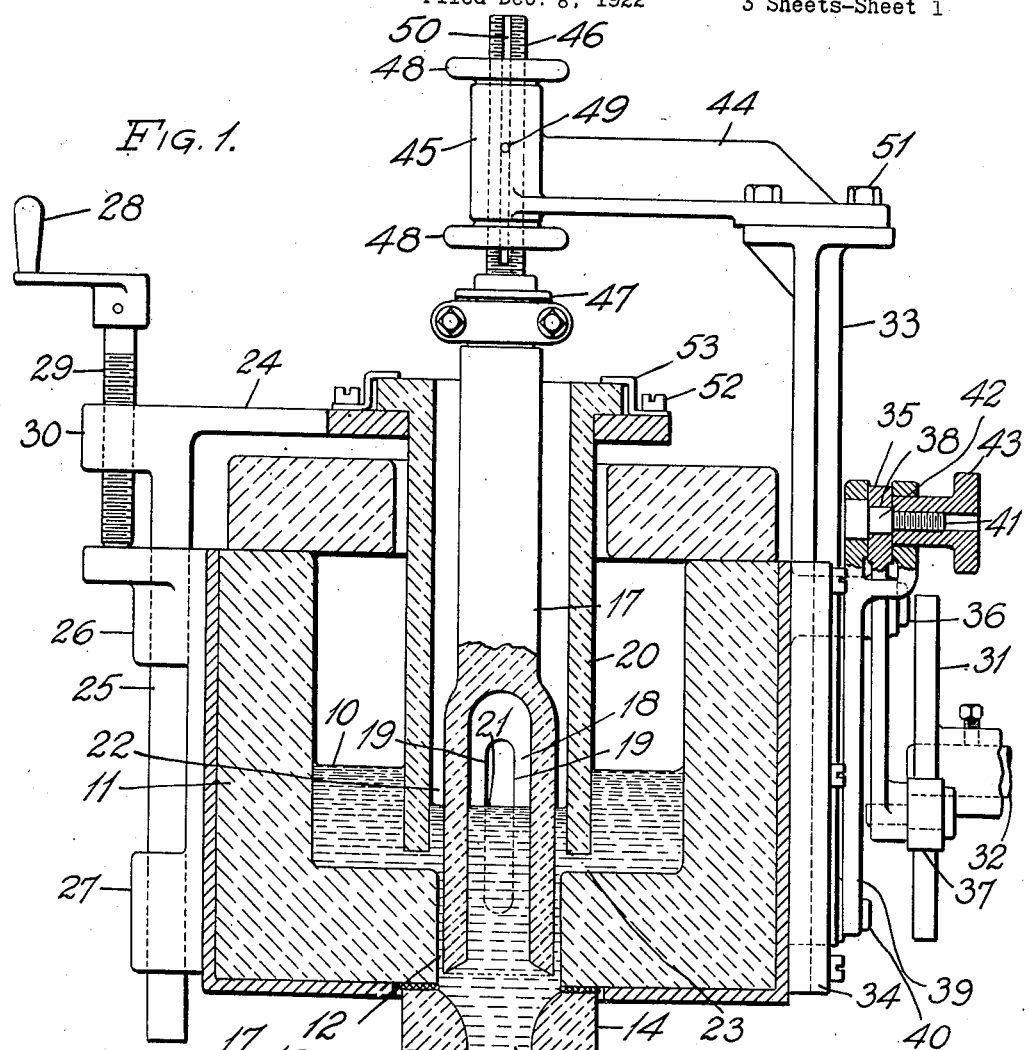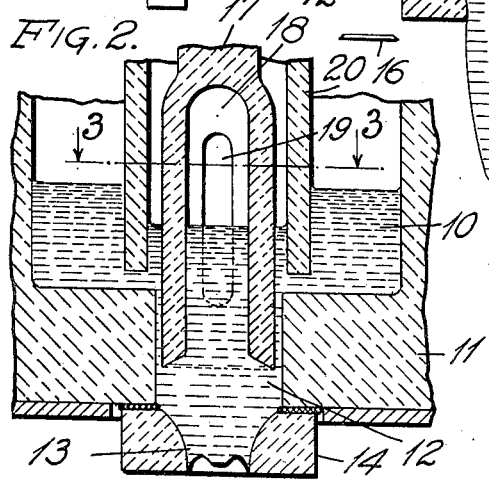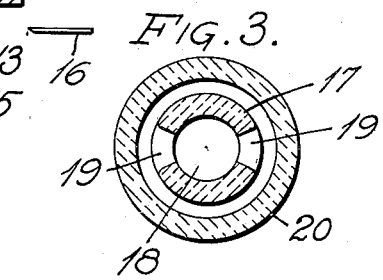

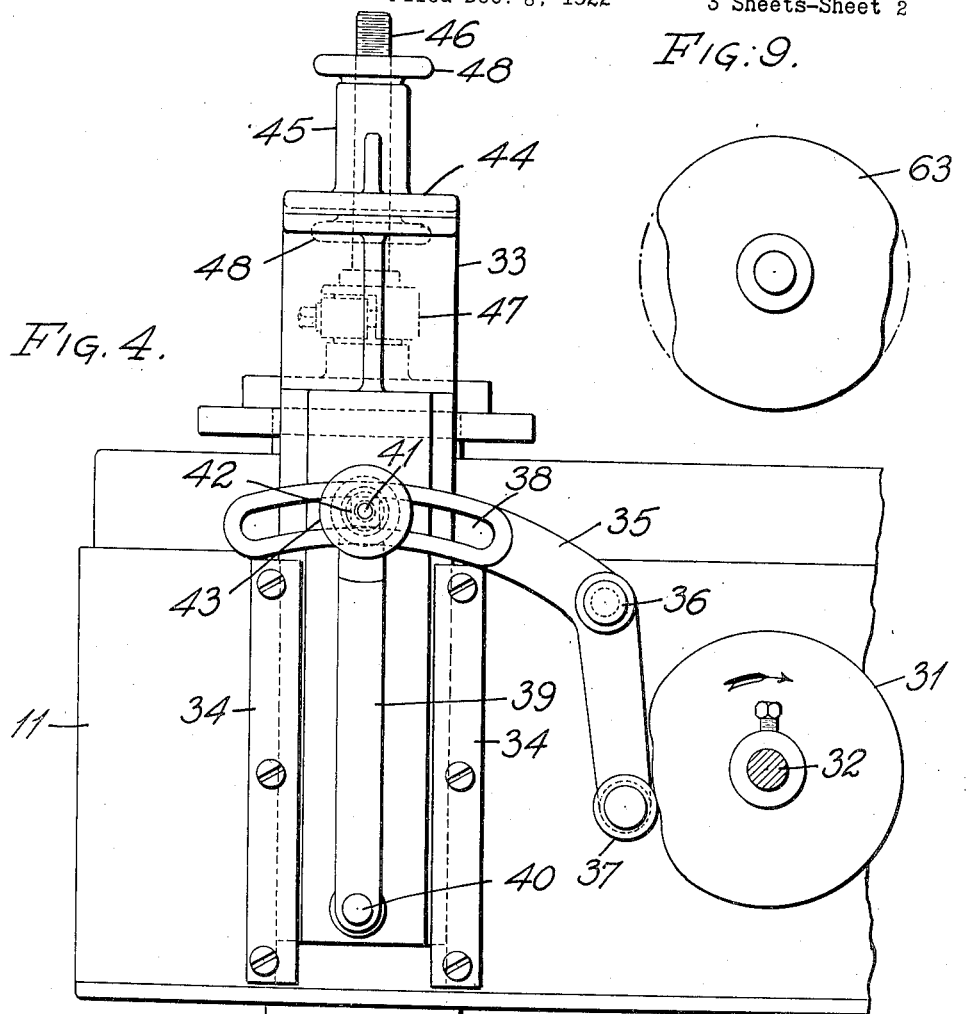
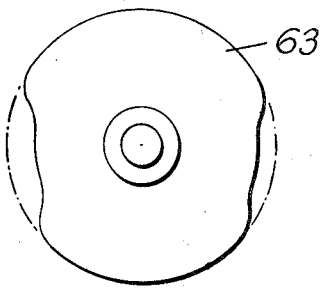
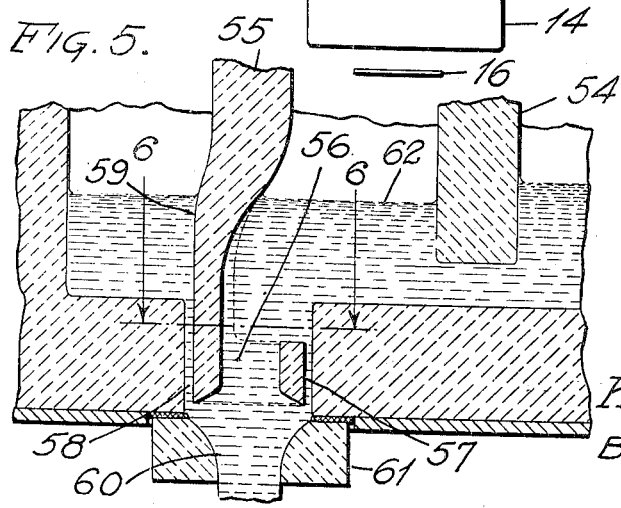
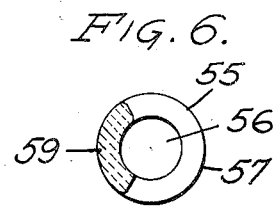

Patented Oct. 19, 1926.

1,603,862

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

APPARATUS FOR FEEDING MOLTEN GLASS.

Application filed December 8, 1922. Serial No. 605,681.

This invention relates to methods of and apparatus for separating molten glass into mold charges, its object being to feed the glass in successive suspended masses of any predetermined size and shape for delivery to the molds of glass shaping machines, and to adapt the feeding apparatus to produce mold charges of a size and shape best suited for the production of any of the numerous sizes and shapes of commercial glassware.

It is desirable thus to shape the mold charges before delivery to the molds, so that all portions of the surface, and especially the side and bottom surface, of each mold charge will, when delivered, contact as nearly as possible equally and simultaneously with the wall of its mold in order that the surface of the charge will be chilled uniformly and will therefore be more equally stretched and distributed in the subsequent blowing or other shaping operations, so that the outer surface of the mold charge will, with a minimum of stretching or distortion become the outer surface of the finished article.

By the present method, the molten glass is flowed from a furnace forehearth or other receptacle through the interior of a hollow plunger disposed above and in line with the outlet, the plunger being reciprocated periodically at the times, and to the extent required for periodically assisting, retarding, and, if desired, reversing the gravitational flow of the column of glass through the outlet, so that the lower end of the column as it is extruded from the outlet is formed into suspended gathers or mold charges of the desired size and contour, and the top of the column is built up by fresh glass flowing directly into it.

Among the advantages of this method are the following: Preliminary to its discharge from the outlet, the glass is formed into a compact column, over and in alignment with the outlet, the column having substantially the general size and cross section of the desired mold charges. The column is surrounded by and directly drawn from the interior of the main body of glass, which thus forms a heated environment, from and within which the column is formed by building up its top end. The desired movements of the column, either forwardly or backwardly, are assisted by frictional contact of its outer surface with the interior surrounding wall of the moving plunger, instead of being impeded by the frictional resistance of a stationary well or wall leading to the outlet. A constant unthrottled flow area is maintained through the internal flow passage and the outlet. Other advantages will appear from the following description:

The desired changes in the shapes of the charges may be effected by proportioning the internal flow passage or passages of the plunger, or by varying the character of the movements of the plunger, or the time and amplitude of its stroke, or by varying its working range within the well or submerged outlet.

Control over the size or weight of the charges is preferably effected mainly by varying the hydrostatic head of glass in the pool, and preferably that portion of the glass immediately surrounding the hollow plunger above the well, as by means of a suitable regulating device, preferably tubular, encircling the plunger and enclosing a supply of glass of the desired height, in which the plunger operates and with which its internal flow passage is in constant communication at all positions of the plunger.

In the drawings.

Figure 1 is a sectional elevation of a machine embodying the invention, with the hollow plunger shown at about its lowermost position;

Fig. 2 is a fragmentary sectional elevation with the plunger shown at about its uppermost position;

Fig. 3 is a sectional plan on line 3—3 of Fig. 2;

Fig. 4 is a side elevation, looking at the right of Fig. 1, showing the plunger operating mechanism;

Fig. 5 is a fragmentary sectional elevation showing a modified form of plunger;

Fig. 6 is a sectional plan on line 6—6 of Fig. 5;

Figs. 7 and 8 are sectional elevations of another modification, with the tube surrounding the plunger omitted, the plunger being shown in substantially its lowermost position in Fig. 7, and in a raised position in Fig. 8; and Fig. 9 shows a modification of the plunger actuating cam.

The supply of molten glass 10 may flow from a furnace or melting tank of any well-known type to the container 11, which may form a forehearth of the furnace. The container is provided with a well 12 terminating in a submerged outlet 13 formed in the removable ring 14. The size of the outlet is adapted to the size of the charges to be made, one of the charges being indicated at 15 ready for severance by the shear blades 16, which may be of any known construction, and adjustable to sever at any desired height, and in desired time relation to the plunger movements.

Projecting into the well or casing 12 is a hollow plunger 17, preferably adapted to fit the casing as closely as is practical, consistent with satisfactory operation of the plunger. The intention is to flow all or the greater portion of the glass forming the mold charges through the central passage 18 of the plunger. Therefore the glass in the well outside of the plunger serves merely or mainly as a packing between the plunger and the wall of the well.

Communicating with the central passage 18 of the plunger are one or more inlet passages 19 of the required flow capacity which remain constantly open for the inflow of glass from the container through the plunger to the submerged outlet 13. These inlets extend both above and below the top of the well at all positions of the plunger, and therefore do not variably throttle the inflow of glass by its changes of position.

The size of the passage 18 of the plunger is preferably made about equal to the size of the discharge outlet 13. The sizes of the opening and the outlet should be proportionate to the sizes or weights of the mold charges to be made.

As the plunger rises it tends to create a void in the well beneath it, which void may be satisfied by the inflow of the glass flowing downwardly through the central passage of the plunger, or by the glass retarded or retracted in the outlet, or by a combination of both, according to the character and especially the speed of the plunger movements. When the plunger is given a rapid upward movement, the retarding or retractive effect through the outlet will be greater than if the plunger is moved slowly.

The downward or extrusion impulses of the plunger are also utilized to control the shape of the mold charge, both at its upper end and through its body while it is passing through and accumulating beneath the outlet. Stronger downward impulses increase the diameter of the portions of the gather then being extruded. Thus the movements of the plunger may be adapted to produce the desired shape of the mold charges. This control is determined by the contour of the cam for operating the plunger, different shaped cams being employed to produce different results.

The severing mechanism will be timed to correspond to the formation of the charges, the remaining stub from which the charge is severed being retracted into the outlet by the upward movement of the plunger, the retraction beginning either before, after, or during severing as desired, depending upon the shape of charge desired.

The hollow plunger may be operated in conjunction either with a fixed or an adjustable head of glass, preferably the latter, because adjusting the head is a convenient way of regulating the weight of the charges. This head may be regulated by means of an adjustable gate for varying the level in the container, but is preferably controlled by a regulating tube 20, immediately surrounding the plunger. This form is preferable in that it provides a smaller pool of glass whose level or head is quickly responsive to the adjustment of the tube. In effect, this regulating tube segregates a pool or column of glass 21 of controlled height immediately surrounding the plunger through adjustment of the height of passage 23 whereby a quick and definite control over the sizes or weights of the charges is maintained. The space 22 between the tube and plunger is made large enough to allow proper operating clearance.

The regulating tube is clamped upon the arm 24 on a slide 25 guided in brackets 26 and 27 on the container. Adjustment of the regulating tube is effected by turning the handle 28 of the feed screw 29, threaded through a lug 30 of the slide 25 and having its lower end engaging the top of the bracket 26.

Reciprocation of the plunger 17 is effected by the adjustable cam 31, mounted on a suitably driven shaft 32. The plunger is carried by a bracket 33 slidably mounted in ways 34 on the container and is actuated through connections comprising a lever 35 mounted on a fixed stud 36 and having a roll 37 engaging the cam 31. The horizontal arm of the lever is slotted at 38 and adjustably connected with a link 39 pivotally connected at 40 to the plunger carrying bracket 33. The connection between the link 39 and lever 35 is adjustable and comprises a stud 41 having a square central portion 42 slidable in the slot 38 of the lever and also a threaded portion carrying a hand wheel 43 by which the stud may be clamped upon the lever. The link 39 is forked to receive the slotted arm of the lever, one side of the fork being pivoted upon the head of the stud 41 and the other upon the hub of the hand wheel 43.

This construction permits the connection between the link and lever to be adjusted toward or from the pivot 36 of the lever while the machine is in operation, thus varying the effective leverage of the lever and thereby varying the length of the stroke of the plunger. The length of the stroke of the plunger may be varied without changing its lowest position, by making the slot 38 in the form of an arc having its center at 40 when the plunger is at its lowermost position.

The cam 31 is removably mounted on the shaft 32 in order that it may be replaced by other cams for varying the plunger movements to regulate the control over the discharge of the glass, the contour of each cam being adapted to produce the particular results desired in the operation of the machine from time to time.

Where it is desired to feed mold charges to two or more shaping machines producing articles of different shapes or sizes, or both, the plunger operating cam may be provided with the desired number of lobes of the proper contours, so that for each revolution of the cam shaft a series of mold charges of the required shapes and sizes will be produced; one type of multiple lobe cam being shown at 63 in Fig. 9 by way of illustration.

The plunger carrying bracket includes a removable arm 44 having a bearing 45 in which is slidably mounted a screw shank 46 provided with a suitable clamp 47, detachably connected with the plunger 17. The plunger may be vertically adjusted by turning the upper and lower nuts 48, threaded upon the screw 46. The screw is held against rotation by a pin or spline 49 engaging a splineway 50 formed in the screw. The arm 44 and plunger carried thereby may be removed as a unit by detaching the bolts 51 connecting the arm with the upright portion 33 of the bracket.

The regulating tube 20 is also detachable and may be removed by unscrewing the studs 52 for securing the clamping members 53 upon the arm 24, the removal of the tube being effected after the plunger has been removed.

In the modifications shown in Figs. 5 to 8 the plunger operating mechanism may be the same as that shown in Figs. 1 and 4. In these modifications the regulating tube 20 is omitted and the hydrostatic head of glass over the well in the container is, in each case, regulated by an adjustable gate 54, which may be raised and lowered by a screw, or other well-known means.

The plunger 17 in Figs. 7 and 8 and its method of operation is the same as in Fig. 1, the only difference between this modification and the form shown in Fig. 1 being the removal of the regulating tube 20 and connected parts, and the substitution of the adjustable gate 54 for regulating the level of the glass in the container.

In the modified form of plunger 55, shown in Figs. 5 and 6, the glass flows into the central passage 56 of the plunger directly from above. In this construction the resistance to the flow of the glass past the plunger is considerably reduced by shortening the effective length of the plunger, as well as by flowing the column of glass into the central passage in a direction parallel to and coinciding with the axis of the plunger. However, the resistance may be increased by lengthening the ring shaped portion 57 of the plunger, which preferably lies wholly within the well for all positions of the plunger, and which is adopted to fit as closely within the well 58 as practical, to prevent any appreciable flow of glass between the outside of the plunger and the wall of the well. The offset portion 59 of the plunger which connects the annular or ring portion 57 with the body of the plunger is positioned at the left of the well, thus offering little obstruction to the glass flowing under the gate and into the well. However, the clamp 47 which will be applied at the top of the plunger, as in Fig. 1, may be loosened and the plunger rotated about its axis so as to position the portion 59 at any desired angle relative to the gate 54. In effect the portion 59 forms an adjustable baffle for the glass flowing to the well and its position will determine the resistance offered to the glass in its flow from the gate to the well.

The outlet 60 in the discharge ring 61 may be of any size found desirable, but is preferably about equal to the size of the central passage 56 of the plunger.

The illustrated embodiment of the invention may be modified in construction, arrangement, and mode of operation by those skilled in the art, without departing from the scope of the invention as defined in the appended claims.

Certain features disclosed but not claimed in the present application, form a part of the subject matter of a copending application of the present inventor, Serial No. 615,308, filed January 27, 1923.

Certain other features relating particularly to the mechanism for adjusting the plunger are described and claimed in my earlier copending applications, Serial No. 541,639, filed March 7, 1922, and Serial No. 543,571, filed March 14, 1922.

I claim:

1. In apparatus for segregating mold charges from a body of molten glass, the combination with a container for the glass provided with a discharge outlet, of a member having an internal flow passage into and through which the glass can flow by gravity to the outlet, and means for reciprocating said member to periodically accelerate or retard the gravitational flow to the outlet.

2. In apparatus for segregating mold charges from a body of molten glass, the combination with a container for the glass provided with a discharge outlet, of a movable member provided with a flow passage connecting at its upper end with the body of glass, and at its lower end with the outlet, and means for moving said member to periodically raise and lower its contained glass to modify the gravity flow therethrough.

3. In apparatus for segregating mold charges from a body of molten glass, the combination with a container for the glass having a discharge outlet, of a movable plunger adjacent to the outlet provided with an internal passage for the flow of glass from the container to its outlet, and means for enclosing on the outer side of the plunger a space suited for receiving a sufficient amount of the glass to act as a packing for the plunger, without permitting appreciable flow of the glass therethrough.

4. In apparatus for feeding molten glass, the combination with a glass container provided with a well terminating in a discharge outlet, a plunger fitting in the well closely enough to prevent appreciable discharge of glass past the outside of the plunger, said plunger having an internal flow passage for the discharge of glass to the outlet, and means for reciprocating the plunger in the well.

5. In apparatus for feeding molten glass, the combination with a glass container provided with a submerged outlet, of a plunger movable in the glass relative to the outlet and having an internal flow passage communicating with the glass above its discharge end at all positions of the plunger, and means for actuating the plunger to periodically apply discharging impulses to the glass at the outlet.

6. In apparatus for feeding molten glass, the combination with a container for the glass provided with a submerged outlet, of a vertically movable plunger having its lower end projecting into the glass opposite the outlet and provided with a passage having inlet and outlet openings for the flow of glass from the container to the outlet, and means for moving said plunger, including means for varying the length of its stroke.

7. In apparatus for feeding molten glass, the combination with a container for the glass provided with a submerged outlet, of a plunger having its lower end projecting into the glass above the outlet and provided with a passage having inlet and outlet openings for the flow of glass from the container to the outlet, and means for moving the plunger, including means for adjusting the limits of its movements.

8. In apparatus for feeding molten glass, the combination with a container for the glass provided with a submerged outlet, of a plunger having its lower end projecting into the glass opposite the outlet and provided with a constantly open flow passage having an inlet and an outlet opening to permit the flow of glass from the container to the outlet, means for regulating the flow of glass to said passage, means for reciprocating the plunger to accelerate or retard the discharge from the outlet, and means for severing mold charges from the glass discharged through the outlet.

9. In apparatus for segregating mold charges from a body of molten glass, the combination with a container for the glass provided with a well terminating in a discharge outlet, of a member positioned in the glass over the outlet and provided with a flow passage entirely submerged within the well, and means for actuating said member to periodically apply impulses to the glass at the outlet.

10. In apparatus for segregating mold charges from a body of molten glass, the combination with a container for the glass provided with a discharge outlet, of a member having a ring shaped portion entirely submerged within the glass and provided with a flow passage in the side thereof and communicating with the outlet, and means for operating said member to produce impulses in the glass at the outlet.

11. In apparatus for segregating mold charges from a body of molten glass, the combination with a container for the glass having a discharge outlet, of a movable plunger adjacent to the outlet provided with an internal passage for the flow of glass from the container to its outlet, and means to enclose a film of molten glass around the plunger of such thickness as to act as a packing for the plunger without permitting appreciable flow of glass thereby.

12. An apparatus for feeding molten glass, the combination with a container for the glass provided with a submerged outlet, of a vertically movable plunger having a tubular end submerged in the glass opposite the outlet and through which glass flows to said outlet, a tube projecting into the glass around the plunger, and means for adjusting the tube toward and from the outlet to regulate the flow of glass to the outlet.

13. In apparatus for feeding molten glass, the combination with a container for the glass provided with a submerged outlet, of a plunger having an annular lower end submerged in the glass adjacent the outlet, an inlet in the side of the plunger through which the glass may flow downwardly through said annular lower end and means for reciprocating said plunger.

14. In apparatus for segregating mold charges from a body of molten glass, the combination with a container for the glass provided with a discharge outlet, of a reciprocable member in vertical alignment with said outlet, and provided with a central axial opening and lateral openings extending from said opening below the glass level and means for reciprocating said member.

Signed at Washington, D. C. this 8th day of December, 1922.

KARL E. PEILER.